US012779440B2

(12) United States Patent
Al Herz et al.

(10) Patent No.: US 12,779,440 B2
(45) Date of Patent: Nov. 3, 2026

(54) CATALYSTS THAT INCLUDE ZEOLITES AND RELATED METHODS

(71) Applicant: Saudi Arabian Oil Company, Dhahran (SA)

(72) Inventors: Mansour Ali Al Herz, Al-Ahsa (SA); Anaam H. Al ShaikhAli, Al Qatif (SA); Yousif Al Hammadi, Al Qatif (SA); Maryam M. Al-Taher, Dammam (SA); Anas Al Aqeeli, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 449 days.

(21) Appl. No.: 18/502,353

(22) Filed: Nov. 6, 2023

(65) Prior Publication Data

US 2025/0144604 A1 May 8, 2025

(51) Int. Cl.

| | |
|---|---|
| ***B01J 29/80*** | (2006.01) |
| ***B01J 6/00*** | (2006.01) |
| ***B01J 29/08*** | (2006.01) |
| ***B01J 29/40*** | (2006.01) |
| ***B01J 37/02*** | (2006.01) |
| ***B01J 37/04*** | (2006.01) |
| ***B01J 37/08*** | (2006.01) |

(52) U.S. Cl.

CPC ............... *B01J 29/80* (2013.01); *B01J 6/001* (2013.01); *B01J 29/088* (2013.01); *B01J 29/40* (2013.01); *B01J 37/0201* (2013.01); *B01J 37/04* (2013.01); *B01J 37/08* (2013.01)

(58) Field of Classification Search

CPC ........ B01J 6/001; B01J 29/084; B01J 29/088; B01J 29/40; B01J 29/80; B01J 35/19; B01J 35/40; B01J 35/615; B01J 35/70; B01J 37/0204; B01J 37/04; B01J 37/08

See application file for complete search history.

(56) References Cited

U.S. PATENT DOCUMENTS

| | | | |
|---|---|---|---|
| 5,318,695 | A | 6/1994 | Eberly et al. |
| 5,943,857 | A | 8/1999 | Ansell et al. |
| 6,482,315 | B1 | 11/2002 | Roberie et al. |
| 7,019,187 | B2 | 3/2006 | Powers |

(Continued)

FOREIGN PATENT DOCUMENTS

| | | | |
|---|---|---|---|
| CN | 118767982 A * | 10/2024 | .......... B01J 37/0009 |
| EP | 1733006 | 5/2020 | |

(Continued)

OTHER PUBLICATIONS

Machine translation of Zhou et al (CN 118767982). (Year: 2024).*

(Continued)

*Primary Examiner* — Brian A Mccaig
(74) *Attorney, Agent, or Firm* — Fish & Richardson P.C.

(57) ABSTRACT

The disclosure relates to catalysts that include a first zeolite selected from ZSM-5 and Y zeolite impregnated with $P_2O_5$ and a second zeolite different from the first zeolite selected from ZSM-5 and Y zeolite impregnated with $La_2O_3$. The catalysts can also include alumina, clay, and silica. The catalysts can be used for various hydrocarbon-related processes, such as cracking hydro-treated atmospheric residue (HT AR) and hydro-treated vacuum gas oil (HT VGO).

20 Claims, 2 Drawing Sheets

(56) References Cited

U.S. PATENT DOCUMENTS

| | | | |
|---|---|---|---|
| 7,141,526 | B2 | 11/2006 | Yoshikawa |
| 7,763,560 | B2 | 7/2010 | Horiuchi et al. |
| 8,845,882 | B2 | 9/2014 | Shu et al. |
| 9,067,196 | B2 | 6/2015 | Ravichandran et al. |
| 9,783,743 | B2 | 10/2017 | Dinda et al. |
| 10,086,367 | B2 | 10/2018 | Smith et al. |
| 10,525,451 | B2 | 1/2020 | McGuire, Jr. et al. |
| 10,683,458 | B2 | 6/2020 | Smith et al. |
| 11,446,645 | B2 | 9/2022 | Koseoglu et al. |
| 11,566,185 | B1 | 1/2023 | Koseoglu et al. |
| 11,725,149 | B1 | 8/2023 | Jin et al. |
| 2005/0211603 | A1 | 9/2005 | Guillaume et al. |
| 2011/0083996 | A1 | 4/2011 | Shafi et al. |
| 2013/0066131 | A1 | 3/2013 | Harris |
| 2013/0274534 | A1* | 10/2013 | Gill ........................ B01J 29/088 585/708 |
| 2014/0275673 | A1 | 9/2014 | Long et al. |
| 2020/0255753 | A1 | 8/2020 | Al-Herz et al. |
| 2022/0333017 | A1 | 10/2022 | Gopal et al. |
| 2022/0348829 | A1 | 11/2022 | Sabahi et al. |
| 2023/0072292 | A1 | 3/2023 | Li et al. |
| 2023/0192573 | A1 | 6/2023 | De Silva et al. |
| 2023/0202851 | A1* | 6/2023 | Luo ......................... C01B 39/10 502/77 |
| 2023/0249165 | A1 | 8/2023 | Lin et al. |
| 2023/0294083 | A1 | 9/2023 | De Silva et al. |
| 2023/0415133 | A1 | 12/2023 | Iyyamperumal et al. |

FOREIGN PATENT DOCUMENTS

| | | | | |
|---|---|---|---|---|
| EP | 4137457 A1 | 2/2023 | | |
| JP | 6133989 | 5/2017 | | |
| WO | WO 2009073436 | 6/2009 | | |
| WO | WO 2010009077 | 1/2010 | | |
| WO | WO 2010009082 | 1/2010 | | |
| WO | WO 2010009089 | 1/2010 | | |
| WO | WO 2013142563 | 9/2013 | | |
| WO | WO-2020151646 A1 * | 7/2020 | .............. | B01J 35/40 |
| WO | WO 2023172744 A1 | 9/2023 | | |
| WO | WO 2024006381 A1 | 1/2024 | | |
| WO | WO 2024011028 A1 | 1/2024 | | |

OTHER PUBLICATIONS

Machine translation of Li et al (WO 2020151646). (Year: 2020).*

Chen et al., Novel propylene production route: utilizing hydrotreated shale oil as feed stock via two-stage riser catalytic cracking. Energy Fuels, 2015, 29,7190-7195.

Corma et al., "Crude oil to chemicals: light olefins from crude oil." Catalysis Science & Technology, 2017, 7(1): 12-46, 35 pages.

Qureshi et al., "Steam catalytic cracking of crude oil over novel hierarchical zeolite-containing mesoporous silica-alumina core-shell catalysts," Journal of Analytical and Applied Pyrolysis, Sep. 2022, 166: 105621, 11 pages.

Usman et al., "Catalytic cracking of crude oil to light olefins and naphtha: Experimental and kinetic modeling," Chemical Engineering Research and Design 120(Supplement C), Apr. 2017, 120:121-137, 17 pages.

International Search Report and Written Opinion in International Appln. No. PCT/US2025/046568, mailed on Jan. 14, 2026, 14 pages.

Talebian-Kiakalaich et al., "Synthesis of hierarchical Y and ZSM-5 zeolites using post-treatment approach to maximize catalytic cracking performance," Journal of Industrial and Engineering Chemistry, Aug. 2020, 88:167-177, 11 pages.

SAIP Examination Report in Saudi Arabian Appln. No. 1020246118, mailed Mar. 10, 2026, 8 pages (with English translation).

* cited by examiner

CATALYSTS THAT INCLUDE ZEOLITES AND RELATED METHODS

FIELD

The disclosure relates to catalysts that include a first zeolite selected from ZSM-5 and Y zeolite impregnated with $P_2O_5$ and a second zeolite different from the first zeolite selected from ZSM-5 and Y zeolite impregnated with $La_2O_3$. The catalysts can also include alumina, clay, and silica. The catalysts can be used for various hydrocarbon-related processes, such as cracking hydro-treated atmospheric residue (HT AR) and hydro-treated vacuum gas oil (HT VGO).

BACKGROUND

Light olefins can be produced through thermal cracking or steam pyrolysis of petroleum gases and distillates, such as naphtha, kerosene, or gas oil. Light olefins can also be produced through fluid catalytic cracking processes. Typical hydrocarbon feeds for fluid catalytic cracking processes include hydrocracked bottoms and heavy feed fractions such as vacuum gas oil and atmospheric residue.

SUMMARY

The disclosure relates to catalysts that include a first zeolite selected from ZSM-5 and Y zeolite impregnated with $P_2O_5$ and a second zeolite different from the first zeolite selected from ZSM-5 and Y zeolite impregnated with $La_2O_3$. The catalysts can also include alumina, clay, and silica. The catalysts can be used for various hydrocarbon-related processes, such as cracking HT AR and HT VGO.

In general, the catalysts can be used in a variety of processes, such as hydrocarbon-related processes. As an example, in some embodiments, the catalysts can be used for the conversion of atmospheric residue for high-severity fluidized catalytic cracking (HS-FCC) applications to generate petrochemical building blocks such as light olefins. As another example, in some embodiments, the catalysts can be used for the conversion of vacuum gas oil for deep catalytic cracking (DCC) applications to generate petrochemical building blocks such as light olefins.

Generally, the catalysts can provide a variety of benefits, e.g., when used in hydrocarbon-related processes. As an example, in some embodiments, the catalysts can provide relatively high conversions and yields of total light olefins in the cracking of HT AR and HT VGO. As another example, in some embodiments, the catalysts can have relatively high activity and/or selectivity to light olefins relative to certain other catalysts. As a further example, in some embodiments, the catalysts can increase (e.g., maximize) the yield of light olefins relative to certain other catalysts.

In a first aspect, the disclosure provides a catalyst, including a first zeolite including a ZSM-5 or Y zeolite, and a second zeolite including ZSM-5 or Y zeolite. The second zeolite is different from the first zeolite, the first zeolite is impregnated with $P_2O_5$, and the second zeolite is impregnated with $La_2O_3$.

In some embodiments, the first zeolite includes ZSM-5, and the second zeolite includes Y zeolite.

In some embodiments, the first zeolite includes Y zeolite, and the second zeolite includes ZSM-5.

In some embodiments, the catalyst further includes alumina, clay, and silica.

In some embodiments, the catalyst includes from 5 wt. % to 50 wt. % of the first zeolite, from 5 wt. % to 50 wt. % of the second zeolite, from 0.5 wt. % to 10 wt. % $La_2O_3$, from 0.5 wt. % to 15 wt. % $P_2O_5$, from 0.5 wt. % to 10 wt. % silica, from 30 wt. % to 60 wt. % clay, and from 2 wt. % to 20 wt. % alumina.

In some embodiments, the catalyst includes 20 wt. % of ZSM-5 impregnated with $P_2O_5$, 21 wt. % of Y zeolite impregnated with $La_2O_3$, 2 wt. % silica, 49 wt. % clay, and 8 wt. % alumina.

In some embodiments, the ZSM-5 impregnated with $P_2O_5$ includes 7.5 wt. % $P_2O_5$, and the Y zeolite impregnated with $La_2O_3$ includes 2.5 wt. % $La_2O_3$.

In some embodiments, the clay includes kaolin and/or montmorillonite.

In some embodiments, the ZSM-5 has a silica to alumina molar ratio of 5 to 80.

In some embodiments, the Y zeolite has a silica to alumina molar ratio of 5 to 80.

In some embodiments, the ZSM-5 has a surface area of 200 $m^2/g$ to 800 $m^2/g$.

In some embodiments, the Y zeolite has a surface area of 200 $m^2/g$ to 800 $m^2/g$.

In a second aspect, the disclosure provides a method of using a catalyst of the disclosure to crack hydro-treated atmospheric residue.

In a third aspect, the disclosure provides a method of using a catalyst of the disclosure to crack hydro-treated vacuum gas oil residue.

In a fourth aspect, the disclosure provides a method including: forming a first mixture including a first zeolite including ZSM-5 or Y zeolite, a second zeolite including ZSM-5 or Y zeolite, alumina, clay, and colloidal silica; drying the first mixture; and calcining the first mixture. The second zeolite is different from the first zeolite, the first zeolite is impregnated with $P_2O_5$, and the second zeolite is impregnated with $La_2O_3$.

In certain embodiments, the first mixture is calcined at a temperature of 400° C. to 700° C.

In certain embodiments, the method further includes, prior to forming the first mixture, impregnating the first zeolite with $P_2O_5$. In certain embodiments, impregnating the first zeolite with $P_2O_5$ includes forming a second mixture including the first zeolite and di-ammonium hydrogen phosphate, drying the second mixture, and calcining the second mixture.

In certain embodiments, the method further includes, prior to forming the first mixture, impregnating the second zeolite with $La_2O_3$. In certain embodiments, impregnating the second zeolite with $La_2O_3$ includes forming a second mixture including the second zeolite and lanthanum nitrate (III) hydrate, drying the second mixture, and calcining the second mixture.

DETAILED DESCRIPTION

Figure 1:
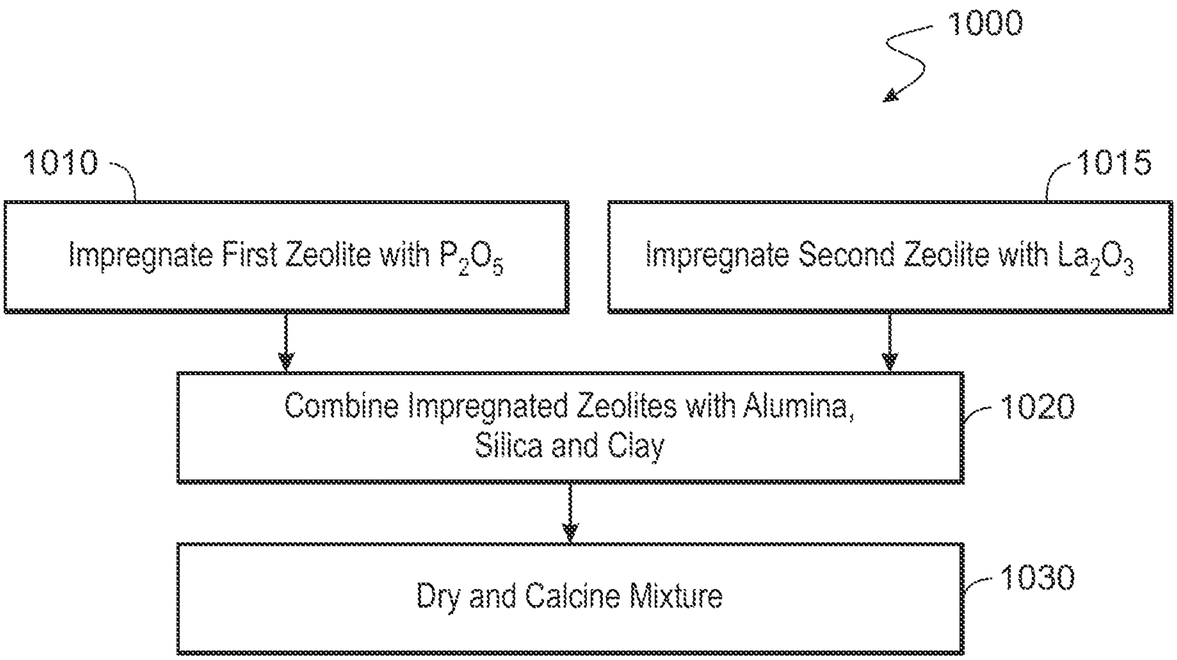
FIG. 1 depicts a flowchart for a method.

In general, the catalyst includes a first zeolite selected from ZSM-5 and Y zeolite impregnated with $P_2O_5$, a second zeolite different from the first zeolite selected from ZSM-5 and Y zeolite impregnated with $La_2O_3$. The catalysts also include alumina, clay, and silica.

Without wishing to be bound by theory, it is believed that the Y zeolite establishes the activity of the catalyst (feed conversion) and cracks larger hydrocarbons into smaller hydrocarbons. This is due to the relatively large pores of the Y zeolite which facilitate the diffusion of larger molecules. Further, the silica to alumina ratio relates to the acidity of the zeolite with a lower silica-to-alumina ratio indicating higher acidity as aluminum atoms control the acidity. The catalytic cracking is believed to occur at these acidic sites. Therefore, feed conversion is expected to increase proportionally with the density of the acidic sites.

Without wishing to be bound by theory, it is believed that the ZSM-5 establishes the selectivity to light olefins such as propylene, cracks relatively light hydrocarbons ($C_6$-$C_9$ olefins) selectively to propylene, and is a gasoline octane improver as ZSM-5 increases the selectivity of olefinic molecules and thus the octane number. The silica to alumina ratio (acidity) of ZSM-5 has an influence on the selectivity. The acidity is selected to increase the conversion to light olefins without facilitating hydrogen transfer which saturates the formed olefins into their relevant alkanes.

Without wishing to be bound by theory, it is believed that the $La_2O_3$ improves the hydrothermal stability of the zeolite it is impregnated in, promotes the cracking activity, and sequesters vanadium in the feed and prevents it deleterious effects.

Without wishing to be bound by theory, it is believed that the $P_2O_5$ stabilizes the structure of the zeolitic framework it is impregnated in by reducing (e.g., preventing) the segregation of the framework alumina and thus improving the hydrothermal stability of the zeolite.

Without wishing to be bound by theory, it is believed that the alumina binds the catalyst components to improve attrition resistance and establishes pre-cracking of feed hydrocarbons. The relatively wide pores (mesopores and macropores) of the alumina are believed to crack larger molecules in the feedstock.

Without wishing to be bound by theory, it is believed that the clay provides physical strength to the catalyst, controls the catalyst's density, improves attrition resistance, and improves resistance to feed poisons. Additionally, without wishing to be bound by theory, it is believed that the clay can improve the heat capacity of the catalyst. For heat balance, the reaction-regeneration cycle can be considered as a closed-loop. The regenerator is the heating medium, and the reactor is the cooling medium (since the reaction is endothermic). Coke combustion in the regenerator supplies the heat to evaporate the feed and conduct the cracking reaction.

Without wishing to be bound by theory, it is believed that the silica acts as a binder and filler to provide additional physical strength to the catalyst, improves attrition resistance of the catalyst and stabilizes the activity of the catalyst.

In some embodiments, the first zeolite includes ZSM-5 and the second zeolite includes Y zeolite. Thus, in such embodiments, the catalyst include ZSM-5 impregnated with $P_2O_5$ and Y zeolite impregnated with $La_2O_3$. In some embodiments, the first zeolite includes Y zeolite and the second zeolite includes ZSM-5. Hence, in such embodiments, the catalyst include Y zeolite impregnated with $P_2O_5$ and ZSM-5 impregnated with $La_2O_3$.

Without wishing to be bound by theory, it is believed that the acidities of ZSM-5 and Y zeolite offer high activity and selectivity to light olefins. In some embodiments, the acidity (silica to alumina) ratio of the Y zeolite and/or the ZSM-5 is tuned to alter the activity and/or selectivity of the catalyst.

In some embodiments, the Y zeolite is USY zeolite (ultra stable Y zeolite). USY can be produced by subjecting the Y zeolite to hydrothermal treatment. Without wishing to be bound by theory, it is believed that the hydrothermal treatment causes dealumination.

In some embodiments, in addition to ZSM-5 and Y zeolite, the catalyst includes mordenite, beta zeolite, and/or ferrierite.

In certain embodiments, the ZSM-5 has a silica to alumina molar ratio of at least 5 (e.g., at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, at least 100, at least 110, at least 120, at least 130, at least 140, at least 150, at least 160, at least 170, at least 180, at least 190, at least 200, at least 210, at least 220, at least 230, at least 240, at least 250, at least 260, at least 270) and/or at most 280 (e.g., at most 270, at most 260, at most 250, at most 240, at most 230, at most 220, at most 210, at most 200, at most 190, at most 180, at most 170, at most 160, at most 150, at most 140, at most 130, at most 120, at most 110, at most 100, at most 95, at most 90, at most 85, at most 80, at most 75, at most 70, at most 65, at most 60, at most 55, at most 50, at most 45, at most 40, at most 35, at most 30, at most 25, at most 20 at most 15, at most 10). In certain embodiments, the ZSM-5 has a surface area of at least 200 (e.g., at least 250, at least 300, at least 350, at least 400, at least 450, at least 500, at least 550, at least 600, at least 650, at least 700, at least 750) $m^2/g$ and/or at most 800 (e.g., at most 750, at most 700, at most 650, at most 600, at most 550, at most 500, at most 450, at most 400, at most 350, at most 300, at most 250) $m^2/g$. In certain embodiments, the ZSM-5 zeolite has an average total pore volume per unit weight of at least 0.01 (e.g., at least 0.02, at least 0.03, at least 0.04, at least 0.05, at least 0.06, at least 0.07, at least 0.08, at least 0.09, at least 0.1, at least 0.15, at least 0.2, at least 0.25, at least 0.3, at least 0.35, at least 0.4, at least 0.45) milliliters per gram (mL/g) and/or at most 0.5 (e.g., at most 0.45, at most 0.4, at most 0.35, at most 0.3, at most 0.25, at most 0.2, at most 0.15, at most 0.1, at most 0.09, at most 0.08, at most 0.07, at most 0.06, at most 0.05, at most 0.04, at most 0.03, at most 0.02) mL/g.

In certain embodiments, the Y zeolite has a silica to alumina molar ratio of at least 5 (e.g., at least 10, at least 15, at least 20, at least 25, at least 30, at least 35, at least 40, at least 45, at least 50, at least 55, at least 60, at least 65, at least 70, at least 75) and/or at most 80 (e.g., at most 75, at most 70, at most 65, at most 60, at most 55, at most 50, at most 45, at most 40, at most 35, at most 30, at most 25, at most 20 at most 15, at most 10). In certain embodiments, the Y zeolite has a surface area of at least 200 (e.g., at least 250, at least 300, at least 350, at least 400, at least 450, at least 500, at least 550, at least 600, at least 650, at least 700, at least 750) $m^2/g$ and/or at most 800 (e.g., at most 750, at most 700, at most 650, at most 600, at most 550, at most 500, at most 450, at most 400, at most 350, at most 300, at most 250) $m^2/g$.

In certain embodiments, the ZSM-5 and/or Y zeolite exhibit one or more of the properties listed in Table 1.

TABLE 1

| Zeolite properties | | | | | |
|---|---|---|---|---|---|
| | $SiO_2/Al_2O_3$ Mole Ratio | Nominal Cation Form | $Na_2O$ Weight % | Unit Cell Size, Å | Surface Area, $m^2/g$ |
| ZSM-5 | 30 | Ammonium | 0.05 | | 405 |
| Y zeolite | 80 | Hydrogen | 0.03 | 24.24 | 780 |

In some embodiments, the catalyst includes at least 5 (e.g., at least 10, at least 15, at least 20, at least 25, at least 30, at least 35, at least 40, at least 45) wt. % and/or at most 50 (e.g., at most 45, at most 40, at most 35, at most 30, at most 25, at most 20, at most 15, at most 10) wt. % of the first zeolite. In such embodiments, the first zeolite is ZSM-5 or Y zeolite.

In some embodiments, the catalyst includes at least 5 (e.g., at least 10, at least 15, at least 20, at least 25, at least 30, at least 35, at least 40, at least 45) wt. % and/or at most 50 (e.g., at most 45, at most 40, at most 35, at most 30, at most 25, at most 20, at most 15, at most 10) wt. % of the second zeolite. In such embodiments, the second zeolite is ZSM-5 or Y zeolite, providing that the first zeolite is different from the second zeolite. In other words, if the first zeolite is ZSM-5, then the second zeolite is Y zeolite, and, if the first zeolite is Y zeolite, then the second zeolite is ZSM-5.

In certain embodiments, the catalyst includes at least 0.5 (e.g., at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5, at least 10, at least 10.5, at least 11, at least 11.5, at least 12, at least 12.5, at least 13, at least 13.5, at least 14, at least 14.5) wt. % and/or at most 15 wt. % (e.g., at most 14.5, at most 14, at most 13.5, at most 13, at most 12.5, at most 12, at most 11.5, at most 11, at most 10.5, at most 10, at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5, at most 2, at most 1.5, at most 1) wt. % $P_2O_5$. In certain embodiments, the first zeolite includes at least 0.5 (e.g., at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5, at least 10, at least 10.5, at least 11, at least 11.5, at least 12, at least 12.5, at least 13, at least 13.5, at least 14, at least 14.5) wt. % and/or at most 15 wt. % (e.g., at most 14.5, at most 14, at most 13.5, at most 13, at most 12.5, at most 12, at most 11.5, at most 11, at most 10.5, at most 10, at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5, at most 2, at most 1.5, at most 1) wt. % of $P_2O_5$.

In certain embodiments, the catalyst includes at least 0.5 (e.g., at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5) wt. % and/or at most 10 wt. % (e.g., at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5, at most 2, at most 1.5, at most 1) wt. % $La_2O_3$. In certain embodiments, the second zeolite includes at least 0.5 (e.g., at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5) wt. % and/or at most 10 wt. % (e.g., at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5, at most 2, at most 1.5, at most 1) wt. % $La_2O_3$.

In general, the silica can be in one or more of a variety of appropriate forms. As an example, in some embodiments, the silica includes colloidal silica. In some embodiments, the catalyst includes at least 0.5 (e.g., at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5) wt. % and/or at most 10 wt. % (e.g., at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5, at most 2, at most 1.5, at most 1) wt. % silica. In some embodiments, the silica has a molecular weight of 60.08 g/mol. In some embodiments, the silica has a relative density of 1.3 g/ml.

Generally, the clay can be in one or more of a variety of appropriate forms. As an example, in certain embodiments, the clay includes kaolin and/or montmorillonite. In certain embodiments, the catalyst includes at least 30 (e.g., at least 35, at least 40, at least 45, at least 50, at least 55) wt. % and/or at most 60 (e.g., at most 55, at most 50, at most 45, at most 40, at most 35) wt. % clay. In certain embodiments, the clay has a specific gravity of 2.2. In certain embodiments, the clay has a molecular weight of 258.2 g/mol. In certain embodiments, the clay has a melting point of 1760° C.

In some embodiments, the catalyst includes at least 2 (e.g., at least 4, at least 6, at least 8, at least 10, at least 12, at least 14, at least 16, at least 18) and/or at most 20 (e.g., at most 18, at most 16, at most 14, at most 12, at most 10, at most 8, at most 6, at most 4) wt. % alumina. In some embodiments, the alumina has a density of at least 2.8 (e.g., at least 2.9) $g/cm^3$ and/or at most 3 (e.g., at most 2.9) $g/cm^3$. In some embodiments, the alumina has a loose bulk density of 670-750 g/L. In some embodiments, the alumina has a packed bulk density of 800-1100 g/L. In some embodiments, the alumina has a particle size ($d_{50}$) of 60 μm. In some embodiments, the alumina has a surface area (BET) of 0.50 ml/g after activation at 350° C. for 3 hours. In some embodiments, the alumina has a pore volume of 0.50 ml/g after activation at 350° C. for 3 hours. In some embodiments, the alumina has a crystallite size (12) of 4.5 nm.

In certain embodiments, the catalyst can have a crystallinity of at least 10 (e.g., at least 15, at least 20, at least 25, at least 30, at least 35, at least 40, at least 45, at least 50, at least 55, at least 60, at least 65, at least 70, at least 75, at least 80, at least 85, at least 90, at least 95) % and/or at most 100 (e.g., at least 95, at least 90, at least 85, at least 80, at least 75, at least 70, at least 65, at least 60, at least 55, at least 50, at least 45, at least 40, at least 35, at least 30, at least 25, at least 20, at least 15) %. Without wishing to be bound by theory, it is believed the crystallinity is typically associated with the zeolites. In certain embodiments, the catalyst can have an attrition index of at least 3 (e.g., at least 4, at least 5, at least 6, at least 7, at least 8, at least 9, at least 10, at least 11, at least 12, at least 13, at least 14) % and/or at most 15 (e.g., at most 14, at most 13, at most 12, at most 11, at most 10, at most 9, at most 8, at most 7, at most 6, at most 5, at most 4) %. In certain embodiments, the catalyst can have a crystallinity of at least 200 (e.g., at least 250, at least 300, at least 350, at least 400, at least 450, at least 500, at least 550, at least 600, at least 650, at least 700, at least 750) $m^2/g$ and/or at most 800 (e.g., at most 750, at most 700, at most 650, at most 600, at most 550, at most 500, at most 450, at most 400, at most 350, at most 300, at most 250) $m^2/g$. In certain embodiments, the catalyst can have an average particle size of at least 40 (e.g., at least 50, at least 60, at least 70, at least 80, at least 90, at least 100, at least 110) μm and/or at most 120 (e.g., at most 110, at most 100, at most 90, at most 80, at most 70, at most 60, at most 50) μm.

Without wishing to be bound by theory, it is believed that the catalysts fulfill the standard specifications for fluid catalytic crack processes, including relatively high activity, relatively high selectivity to light olefins, proper active site density, regenerability, stability, mechanical stability and attrition loss resistance, heat capacity for heat transfer and particle size distribution. Without wishing to be bound by theory, it is believed that the relatively high activity is provided by the relatively large pores of the Y zeolite, the relatively high acidity of the Y zeolite and the relatively large surface area of the Y zeolite. Without wishing to be bound by theory, it is believed that the relatively high selectivity to light olefins is provided by the ZSM-5 zeolite which has a smaller pore size relative to the Y zeolite. Without wishing to be bound by theory, it is believed that the proper active site density is governed by the acidities of ZSM-5 and Y zeolites. Without wishing to be bound by theory, it is believed that the produced coke from the reactions can be combusted in the regenerator without exceeding the ceiling temperature of the regenerator, thereby providing regenerability. Without wishing to be bound by theory, it is believed that the catalysts have relatively good stability as the catalysts can withstand relatively high process temperatures and steam exposure (e.g., the catalyst can withstand steam deactivation at 810° C. for 6 hours). Without wishing to be bound by theory, it is believed that the filler (e.g., kaoline clay) and binder (e.g., silica and alumina) of the catalyst provide mechanical stability and attrition loss resistance. Without wishing to be bound by theory, it is believed that the clay provides heat capacity for heat transfer. Without wishing to be bound by theory, it is believed that the particle size range of the catalyst (40-120 μm) provides a good density for fluidization.

Without wishing to be bound by theory, it is believed that the heat generated from burning coke on the catalyst is the heat needed for evaporating the feed and conducing the cracking reactions.

Methods of Making Catalysts

FIG. 1 shows a flowchart for a method 1000 of making a catalyst.

In step 1010, the first zeolite is impregnated with $P_2O_5$. Impregnation with $P_2O_5$ can include combining the first zeolite with a phosphorus-containing compound, such as di-ammonium hydrogen phosphate ($(NH_4)_2PO_4$), and drying, followed by calcining the mixture. In some embodiments, the first zeolite is impregnated with at least 1 (e.g., at least 2, at least 3, at least 4, at least 5, at least 6, at least 7, at least 8, at least 9, at least 10, at least 11, at least 12, at least 13, at least 14, at least 15, at least 16, at least 17, at least 18, at least 19) wt. % and/or at most 20 (e.g., at most 19, at most 18, at most 17, at most 16, at most 15, at most 14, at most 13, at most 12, at most 11, at most 10, at most 9, at most 8, at most 7, at most 6, at most 5, at most 4, at most 3, at most 2) wt. % phosphorous pentoxide.

In step 1015, the second zeolite is impregnated with $La_2O_3$. Impregnation with $La_2O_3$ can include combining the second zeolite with a lanthanum-containing compound, such as lanthanum nitrate (III) hydrate, and drying, followed by calcining the mixture. In some embodiments, the second zeolite is impregnated with at least 1 (e.g., at least 2, at least 3, at least 4) wt. % and/or at most 5 (e.g., at most 4, at most 3, at most 2) wt. % lanthanum oxide.

In some embodiments, the mixture in the step 1010 and/or 1015 is dried at a temperature of at least 120 (e.g., at least 150, at least 200, at least 250, at least 300, at least 350, at least 400, at least 450) ° C. and/or at most 500 (e.g., at most 450, at most 400, at most 350, at most 300, at most 250, at most 200, at most 150) ° C. In some embodiments, the mixture in the step 1010 and/or 1015 is dried for at least 1 (e.g., at least 2, at least 3, at least 4, at least 5, at least 6, at least 7, at least 8, at least 9, at least 10, at least 11) hour(s) and/or at most 12 (e.g., at most 11, at most 10, at most 9, at most 8, at most 7, at most 6, at most 5, at most 4, at most 3, at most 2) hours. In some embodiments, the mixture in the step 1010 and/or 1015 is dried at 120° C. for 12 hours. In some embodiments, the mixture in the step 1010 and/or 1015 is calcined at a temperature of at least 400 (e.g., at least 450, at least 500, at least 550, at least 600, at least 650) ° C. and/or at most 700 (e.g., at least 650, at least 600, at least 550, at least 500, at least 450) ° C. In some embodiments, the mixture in the step 1010 and/or 1015 is calcined for at least 15 (e.g., at least 16, at least 17, at least 18, at least 19, at least 20, at least 21, at least 22, at least 23) and/or at most 24 (e.g., at most 23, at most 22, at most 21, at most 20, at most 19, at most 18, at most 17, at most 16) hours. In some embodiments, the mixture in the step 1010 and/or 1015 is calcined at 500° C. for 1 hour.

In step 1020, the impregnated zeolites are mixed with alumina, silica (e.g., colloidal silica), and clay. In certain embodiments, the mixture in the step 1020 includes at least 5 (e.g., at least 10, at least 15, at least 20, at least 25, at least 30, at least 35, at least 40, at least 45) wt. % and/or at most 50 (e.g., at most 45, at most 40, at most 35, at most 30, at most 25, at most 20, at most 15, at most 10) wt. % of the first zeolite. In certain embodiments, the mixture in the step 1020 includes at least 5 (e.g., at least 10, at least 15, at least 20, at least 25, at least 30, at least 35, at least 40, at least 45) wt. % and/or at most 50 (e.g., at most 45, at most 40, at most 35, at most 30, at most 25, at most 20, at most 15, at most 10) wt. % of the second zeolite. In certain embodiments, the mixture in the step 1020 includes at least 0.5 (e.g., at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5) wt. % and/or at most 10 (e.g., at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5, at most 2, at most 1.5, at most 1) wt. % colloidal silica. In certain embodiments, the mixture in the step 1020 includes at least 30 (e.g., at least 35, at least 40, at least 45, at least 50, at least 55) wt. % and/or at most 60 (e.g., at most 55, at most 50, at most 45, at most 40, at most 35) wt. % clay. In certain embodiments, the mixture in the step 1020 includes at least 2 (e.g., at least 4, at least 6, at least 8, at least 10, at least 12, at least 14, at least 16, at least 18) wt. % and/or at most 20 (e.g., at most 20, at most 18, at most 16, at most 14, at most 12, at most 10, at most 8, at most 6, at most 4) wt. % alumina.

In step 1030, the resulting mixture is dried then calcined. In some embodiments, the mixture is dried at a temperature of at least 120 (e.g., at least 150, at least 200, at least 250, at least 300, at least 350, at least 400, at least 450) ° C. and/or at most 500 (e.g., at most 450, at most 400, at most 350, at most 300, at most 250, at most 200, at most 150) ° C. In some embodiments, the mixture is dried for at least 1 (e.g., at least 2, at least 3, at least 4, at least 5, at least 6, at least 7, at least 8, at least 9, at least 10, at least 11) hour(s) and/or at most 12 (e.g., at most 11, at most 10, at most 9, at most 8, at most 7, at most 6, at most 5, at most 4, at most 3, at most 2) hours. In some embodiments, the mixture is calcined at a temperature of at least 400 (e.g., at least 450, at least 500, at least 550, at least 600, at least 650) ° C. and/or at most 700 (e.g., at least 650, at least 600, at least 550, at least 500, at least 450) ° C. In some embodiments, the mixture is calcined for at least 15 (e.g., at least 16, at least 17, at least 18, at least 19, at least 20, at least 21, at least 22, at least 23) and/or at most 24 (e.g., at most 23, at most 22, at most 21, at most 20, at most 19, at most 18, at most 17, at most 16) hours.

Methods of Using Catalysts

The catalysts can be used in a variety of hydrocarbon-related processes. As an example, the catalysts can be used in the cracking of HT AR and/or HT VGO. The cracking of HT AR and/or HT VGO can be used to provide higher light olefins (e.g., $C_2$, $C_3$ and $C_4$ compounds). Without wishing to be bound by theory, it is believed that the catalyst has a reasonable production of coke.

As used herein, the yield is calculated as:

Yield = weight of product/weight of feed

In certain embodiments, in the cracking of HT AR or HT VGO the catalysts have a yield of ethylene of at least 5 (e.g., at least 10, at least 15, at least 20, at least 25, at least 30) wt. % and/or at most 35 (e.g., at most 30, at most 25, at most 20, at most 15, at most 10) wt. % at a temperature of 600-700° C. and a catalyst-to-oil ratio of 3 to 35. In certain embodiments, in the cracking of HT AR or HT VGO the catalysts have a yield of propylene of at least 5 (e.g., at least 10, at least 15, at least 20, at least 25, at least 30) wt. % and/or at most 35 (e.g., at most 30, at most 25, at most 20, at most 15, at most 10) wt. % at a temperature of 500-700° C. and a catalyst-to-oil ratio of 3 to 35.

In certain embodiments, in the cracking of HT AR or HT VGO the catalysts has a conversion (see discussion below) of at least 75 (e.g., at least 80, at least 85, at least 90, at least 95, at least 96, at least 97, at least 98, at least 99) % and/or at most 100 (e.g., at most 99, at most 98, at most 97, at most 96, at most 95, at most 90, at most 85, at most 80) at a temperature of 500-700° C. and a catalyst-to-oil ratio of 3 to 35.

The catalysts can be used with HT AR feeds obtained from a HS-FCC plant. The HS-FCC can operate a downer reactor at relatively severe conditions (temperature and catalyst-to-oil ratio) relative to an FCC to increase (e.g., maximize) the selectivity to light olefins. The catalysts can be used with HT VGO obtained from a DCC unit. The DCC can operate a riser reactor at relatively severe conditions (temperature and catalyst-to-oil ratio) relative to an FCC to increase (e.g., maximize) the selectivity to light olefins. Both HS-FCC and DCC technologies are considered as upgraded versions of the FCC units to shift from gasoline mode to light olefins mode.

Example

Materials

TABLE 2

Materials and specifications

| Material | Part Number and Supplier | Specifications | |
|---|---|---|---|
| ZSM-5 | CBV 3024E - Zeolyst International | $SiO_2/Al_2O_3$, molar ratio | 30 |
| | | Nominal Cation Form | Ammonium |
| | | $Na_2O$ Weight | 0.05% |
| | | Surface area, $m^2/g$ | 425 |
| Y zeolite | CBV 780 - Zeolyst International | $SiO_2/Al_2O_3$, molar ratio | 80 |
| | | Nominal Cation Form | Hydrogen |
| | | $Na_2O$ Weight | 0.03% |
| | | Unit Cell Size, A | 24.24 |
| | | Surface area, $m^2/gm$ | 780 |
| | | Crystallinity, % | ≥95 |
| | | Density, gm/mL at 25° C. | 1.22 |
| Kaolin Clay | Petrobras | Appearance | White powder |
| | | Specific gravity | 2.2 |
| | | Molecular weight | 258.2 g/mole |
| | | Melting Point | 1760° C. |
| Alumina | CATAPAL A Alumina - Sasol | Density | 2.8-3 g/cm$^3$ |
| Diammonium hydrogen phosphate | Sigma Aldrich | Molecular weight | 132.06 g/mol |
| | | Relative density | 1.620 g/cm$^3$ |
| Lanthanum(III) nitrate hexahydrate | Sigma Aldrich | Molecular weight | 433.01 g/mol |
| Colloidal silica | Ludox TM-40 - Sigma Aldrich | Molecular weight | 60.08 g/mol |
| | | Relative density | 1.3 g/ml |
| Formic acid | Sigma Aldrich | | |

The parameters were taken directly from the relevant manufacturer which did not clearly provide any ASTM methods or protocols.

Synthetic Procedure

ZSM-5 was impregnated with phosphorus to provide 7.5 wt. % $P_2O_5$ on the zeolite. 14 g $(NH_4)_2PO_4$ was dissolved in demetallized water. 114 g ZSM-5 was dispersed in demetallized water was added to the $(NH_4)_2PO_4$ under wet milling and the resulting mixture was stirred for about 1 hour. The slurry was oven dried at 120° C. for 12 hours followed by calcination at 500° C. for 1 hour and finally cooled to room temperature. Without wishing to be bound by theory, it is believed that the $(NH_4)_2PO_4$ decomposes into $P_2O_5$. The calculation of 7.5 wt. % $P_2O_5$ was based on the decomposition of $(NH_4)_2PO_4$ into $P_2O_5$.

Y zeolite was impregnated with lanthanum to provide 2.5 wt. % $La_2O_3$ on the zeolite. 7 g lanthanum nitrate (III) hydrate, (99.9% metal basis) was dissolved in demetallized water. Under wet milling, 116 g USY zeolite dispersed in demetallized water was added to the lanthanum nitrate (III) hydrate and the resulting mixture was stirred for around 1 hour. The slurry was oven dried at 120° C. for 12 hours followed by calcination at 500° C. for 1 hour and cooled to room temperature.

The alumina was treated with formic acid to produce alumina sol with particle sizes in the range of several hundred nanometers.

The impregnated zeolites were mixed with the treated alumina, silica and clay in the amounts provided in Table 3 in de-metalized water and the resulting mixture was stirred for 1 hour. The obtained slurry was sieved to remove large particles to avoid blockages during spray drying. The spray dryer temperature was set at 300° C. and the feed inlet temperature was set at 110° C. Atomization air was set at 0.125 bar. The spray drying stage was commenced to produce spherical particles within a particle size range suitable for fluidization (40-120 μm). The spray dried catalyst was then placed in temperature programmed oven for drying and calcination at the following program (rate (° C./min): Temperature (° C.): time (hours)): 7:125:7→3:200:1→2:320:1→2:440:7→1:550:1→7:100:1. The catalyst was then ground to fine powder using a mortar and a pestle. Finally, the grounded catalyst was sieved for a fraction between 40-120 microns and used for characterization and evaluation.

TABLE 3

Amounts of catalyst precursors

| Component | Weight % | Notes |
|---|---|---|
| ZSM-5 | 20 | Phosphorous impregnated at 7.5 wt. % $P_2O_5$ on zeolite |
| USY | 21 | Lanthanum impregnated at 2.5 wt. % $La_2O_3$ on zeolite |
| Alumina | 8 | Pural SB from Sasol |
| Clay | 49 | Kaolin |
| Silica | 2 | Added as colloidal silica Ludox TM-40 |

XRD showed that the catalyst had a crystallinity of 22% (ASTM D3906). The attrition index (AI) was 5.4 (ASTM D4058). The BET surface area was 283 $m^2/g$ (ASTM D3663). The particle size distribution measurement showed an average particle size of 67 μm (ASTM D6913) which is typical for an FCC catalyst.

Catalytic Reactions

Catalytic reactions using the catalyst prepared as described above were conducted in a Sakuragi Rikagaku Micro activity test (MAT) instrument using a quartz tubular reactor. The synthesized catalysts were evaluated for cracking hydro-treated atmospheric residue (HT AR) and hydro-treated vacuum gas oil (HT VGO) according to ASTM D-3907. All catalysts were steamed using pure steam at 810° C. for 6 hours prior to the reaction. The experiments were conducted in the MAT unit at 30 seconds time-on-stream (TOS). After each reaction, catalysts were stripped using 30 mL/min $N_2$ flow. The liquid product was collected in the liquid receiver and the gaseous products were collected in a gas burette by water displacement and sent to the GC for analysis. The spent catalysts were used to measure the amount of generated coke from the reaction.

Characterization results for the HT AR and HT VGO are presented in Table 4.

TABLE 4

Characterization of HT AR and HT VGO

| | ASTM | HT AR | HT VGO |
|---|---|---|---|
| Density @ 15° C. (g/cm$^3$) | D-4052 | 0.9231 | 0.9059 |
| Micro carbon Residue (wt. %) | D-4530 | 3.5 | |
| Nitrogen (mg/kg) | D-4629 | 1283 | 910.3 |
| Sulfur (wt. %) | D4294 | 0.262 | 2.165 |
| Fe (ppm) | D 5708 | 3 | <1 |
| Ni (ppm) | D 5708 | 3 | <1 |
| Na (ppm) | D 1067 | <1 | <1 |
| V (ppm) | D 5708 | 5 | <1 |
| Viscosity (cSt) | D7042 | 11.501 (@ 100 ° C.) | 35.737 (@ 40° C.) |
| Simulated Distillation (deg. F.) | D-3710 | | |
| IBP | | 411 | 465 |
| SIMDS 5% | | 540 | 573 |
| SIMDS 10% | | 598 | 635 |
| SIMDS 20% | | 680 | 716 |
| SIMDS 30% | | 740 | 765 |
| SIMDS 40% | | 794 | 801 |
| SIMDS 50% | | 853 | 836 |
| SIMDS 60% | | 919 | 868 |
| SIMDS 70% | | 998 | 902 |
| SIMDS 80% | | 1101 | 941 |
| SIMDS 90% | | 1270 | 991 |
| SIMDS 95% | | >1327 | 1032 |
| FBP | | >1327 | 1136 |

The results from cracking HT AR in the MAT unit over the in-house synthesized HS-FCC catalyst described above are shown in Table 5 below. HT AR was cracked at three temperatures (600, 625 and 650° C.) over a fixed catalyst/feed ratio of 5. As can be seen from the results the yield of light olefins increased with increasing temperature. Higher temperatures increased thermal cracking resulting in increased production of light olefins. Also, it was observed that increasing the cracking temperature led to increased conversion levels.

In tables 5, 6, and 7 iC4 corresponds to isobutane, nC4 corresponds to n-butane, t2C4=corresponds to trans 2-butene, 1C4=corresponds to 1-butene, iC4=corresponds to iso-butene, 1,3-BD corresponds to 1,3-butadiene, and C4 in Liq corresponds to trace $C_4$ captured in liquid product, LCO is light cycle oil, which has a boiling range of 221-343° C., and HCO is heavy cycle oil, which has a boiling range of >343° C.

The conversion was calculated as:

$$\text{Conversion} = 100 - LCO - HCO$$

It was assumed that that everything output that was not LCO or HCO was a product of the reaction.

TABLE 5

MAT results from cracking HT AR

| | | | |
|---|---|---|---|
| Temp. (° C.) | 600.00 | 625.00 | 650.00 |
| T.O.S. (s) | 30.00 | 30.00 | 30.00 |
| Steam deactivation | 810° C., 6 h | 810° C., 6 h | 810° C., 6 h |
| Feed | HTAR | HTAR | HTAR |
| Catalyst/feed weight ratio | 4.55 | 4.52 | 4.71 |
| Conversion (%) | 73.96 | 76.41 | 79.58 |
| Yields (wt %) | | | |
| H2 | 0.62 | 0.69 | 0.73 |
| C1 | 1.85 | 2.67 | 3.84 |
| C2 | 1.43 | 2.00 | 2.74 |
| C2= | 5.57 | 6.16 | 7.56 |
| C3 | 2.33 | 1.90 | 1.95 |
| C3= | 16.92 | 18.45 | 19.50 |
| iC4 | 2.27 | 1.31 | 0.94 |
| nC4 | 1.01 | 0.74 | 0.67 |
| t2C4= | 2.18 | 2.90 | 2.89 |
| 1C4= | 2.68 | 2.50 | 2.59 |
| iC4= | 4.40 | 4.70 | 4.61 |
| c2C4= | 2.33 | 2.53 | 2.53 |
| 1,3-BD | 0.08 | 0.12 | 0.17 |
| C4 in Liq | 0.23 | 0.13 | 0.11 |
| Total Gas | 43.91 | 46.79 | 50.83 |
| Gasoline (Liquid) | 24.11 | 23.47 | 22.02 |

TABLE 5-continued

| MAT results from cracking HT AR | | | |
|---|---|---|---|
| LCO | 16.88 | 15.32 | 13.73 |
| HCO | 9.16 | 8.27 | 6.69 |
| Coke | 5.94 | 6.16 | 6.73 |
| Groups (wt %) | | | |
| H2 − C2 (dry gas) | 9.48 | 11.52 | 14.87 |
| C3 − C4 (LPG) | 34.43 | 35.27 | 35.96 |
| C2 = − C4= (Light olefins) | 34.38 | 37.47 | 39.97 |
| C3= + C4= | 28.81 | 31.32 | 32.41 |
| C4= (Butenes) | 11.89 | 12.87 | 12.91 |
| Molar ratio (mol/mol) | | | |
| C2=/C2 | 4.17 | 3.31 | 2.95 |
| C3=/C3 | 7.60 | 10.17 | 10.50 |
| C4=/C4 | 3.76 | 6.50 | 8.33 |
| iC4=/C4= | 0.37 | 0.37 | 0.36 |
| iC4=/iC4 | 2.01 | 3.72 | 5.10 |

The results from cracking HT VGO in the MAT unit over the catalyst are shown in Table 6 below. HT VGO was cracked at three temperatures (600, 625 and 650° C.) over a fixed catalyst/feed ratio of 5. As can be seen from the results, higher light olefins were obtained with higher temperatures. Higher temperatures increased thermal cracking contribution to the production of light olefins. Also, it was observed that increasing cracking temp led to increased conversion levels.

TABLE 6

| MAT results from cracking HT VGO | | | |
|---|---|---|---|
| Temp. (° C.) | 600.00 | 625.00 | 650.00 |
| T.O.S. (s) | 30.00 | 30.00 | 30.00 |
| Steam deactivation | 810° C., 6 h | 810° C., 6 h | 810° C., 6 h |
| Feed | HT VGO | HT VGO | HT VGO |
| Catalyst/feed weight ratio | 4.63 | 4.57 | 4.78 |
| Conversion (%) | 73.68 | 77.03 | 80.56 |
| Yields (wt %) | | | |
| H2 | 0.23 | 0.22 | 0.24 |
| C1 | 1.10 | 1.12 | 1.22 |
| C2 | 1.43 | 2.15 | 3.41 |
| C2= | 5.50 | 7.03 | 9.47 |
| C3 | 2.12 | 2.13 | 2.24 |
| C3= | 18.76 | 20.38 | 22.35 |
| iC4 | 2.03 | 1.43 | 0.87 |
| nC4 | 0.92 | 0.79 | 0.66 |
| t2C4= | 3.26 | 3.17 | 3.15 |
| 1C4= | 2.64 | 2.74 | 2.88 |
| iC4= | 5.46 | 5.17 | 5.02 |
| c2C4= | 2.65 | 2.62 | 2.63 |
| 1,3-BD | 0.09 | 0.13 | 0.21 |
| C4 in Liq | 0.30 | 0.12 | 0.04 |
| Total Gas | 46.49 | 49.20 | 54.39 |
| Gasoline (Liquid) | 23.32 | 23.71 | 21.96 |
| LCO | 14.10 | 13.69 | 12.46 |
| HCO | 12.22 | 9.28 | 6.98 |
| Coke | 3.87 | 4.12 | 4.21 |

TABLE 6-continued

| MAT results from cracking HT VGO | | | |
|---|---|---|---|
| Groups (wt %) | | | |
| H2 − C2 (dry gas) | 8.27 | 10.52 | 14.34 |
| C3 − C4 (LPG) | 38.23 | 38.68 | 40.05 |
| C2 = − C4= (Light olefins) | 38.67 | 41.35 | 45.75 |
| C3= + C4= | 33.16 | 34.33 | 36.28 |
| C4= (Butenes) | 14.40 | 13.95 | 13.92 |
| Molar ratio (mol/mol) | | | |
| C2=/C2 | 4.13 | 3.51 | 2.98 |
| C3=/C3 | 9.29 | 10.04 | 10.45 |
| C4=/C4 | 5.06 | 6.50 | 9.43 |
| iC4=/C4= | 0.38 | 0.37 | 0.36 |
| iC4=/iC4 | 2.78 | 3.74 | 5.99 |

Table 7 shows the results from cracking HT AR in the MAT unit over the synthesized catalyst. Run No. 1 shows the best result from Table 5. Runs 2-4 show the impact of varying Y zeolite acidity (expressed as $SiO_2/Al_2O_3$ ranging from 60 to 5.2).

TABLE 7

| MAT results from cracking HT AR | | | | | |
|---|---|---|---|---|---|
| RUN No. | 1 | 2 | 3 | 4 | 5 |
| Temp. (° C.) | 650.00 | 650.00 | 650.00 | 650.00 | 650.00 |
| T.O.S. (s) | 30.00 | 30.00 | 30.00 | 30.00 | 30.00 |
| $SiO_2$/Al2O3 ratio | 80 | 60 | 30 | 12 | 5.2 |
| STM. | 810° C., 6 h | 810° C., 6 h | 810° C., 6 h | 810° C., 6 h | 810° C., 6 h |
| Feed | HTAR | HTAR | HTAR | HTAR | HTAR |
| Catalyst/feed weight ratio | 4.71 | 4.27 | 4.06 | 4.46 | 4.93 |
| Conversion (%) | 79.58 | 89.44 | 90.82 | 85.03 | 80.43 |
| Yields (wt %) | | | | | |
| H2 | 0.73 | 0.26 | 0.42 | 0.28 | 0.43 |
| C1 | 3.84 | 3.39 | 4.93 | 3.27 | 3.16 |
| C2 | 2.74 | 2.27 | 3.24 | 2.03 | 2.13 |
| C2= | 7.56 | 5.66 | 6.88 | 5.27 | 6.00 |
| C3 | 1.95 | 1.99 | 2.27 | 1.95 | 2.08 |
| C3= | 19.50 | 19.89 | 18.89 | 19.43 | 19.76 |
| iC4 | 0.94 | 1.39 | 1.61 | 2.01 | 1.54 |
| nC4 | 0.67 | 0.66 | 0.69 | 0.73 | 0.74 |
| t2C4= | 2.89 | 2.97 | 2.76 | 3.10 | 2.90 |
| 1C4= | 2.59 | 2.78 | 2.40 | 2.68 | 2.69 |
| iC4= | 4.61 | 4.89 | 4.18 | 4.84 | 4.67 |
| c2C4= | 2.53 | 2.38 | 2.18 | 2.45 | 2.32 |
| 1,3-BD | 0.17 | 0.16 | 0.16 | 0.18 | 0.17 |
| C4 in Liq | 0.11 | 0.15 | 0.13 | 0.20 | 0.15 |
| Total Gas | 50.83 | 48.83 | 50.75 | 48.41 | 48.72 |
| Gasoline (Liquid) | 22.02 | 37.22 | 33.08 | 31.35 | 27.31 |
| LCO | 13.73 | 8.42 | 7.32 | 9.89 | 12.84 |
| HCO | 6.69 | 2.14 | 1.86 | 5.08 | 6.73 |
| Coke | 6.73 | 3.39 | 6.99 | 5.27 | 4.40 |
| Groups (wt %) | | | | | |
| H2 − C2 (dry gas) | 14.87 | 11.58 | 15.47 | 10.85 | 11.71 |
| C3 − C4 (LPG) | 35.96 | 37.25 | 35.28 | 37.56 | 37.01 |
| C2= − C4= (Light olefins) | 39.97 | 38.87 | 37.58 | 38.15 | 38.65 |
| C3= + C4= | 32.41 | 33.21 | 30.71 | 32.88 | 32.65 |
| C4= (Butenes) | 12.91 | 13.32 | 11.82 | 13.45 | 12.90 |

TABLE 7-continued

| MAT results from cracking HT AR | | | | | |
|---|---|---|---|---|---|
| RUN No. | 1 | 2 | 3 | 4 | 5 |
| Molar ratio (mol/mol) | | | | | |
| C2=/C2 | 2.95 | 2.67 | 2.27 | 2.79 | 3.02 |
| C3=/C3 | 10.50 | 10.47 | 8.72 | 10.44 | 9.93 |
| C4=/C4 | 8.33 | 6.74 | 5.32 | 5.10 | 5.88 |
| iC4=/C4= | 0.36 | 0.37 | 0.35 | 0.36 | 0.36 |
| iC4=/iC4 | 5.10 | 3.65 | 2.69 | 2.50 | 3.15 |

Figure 2:
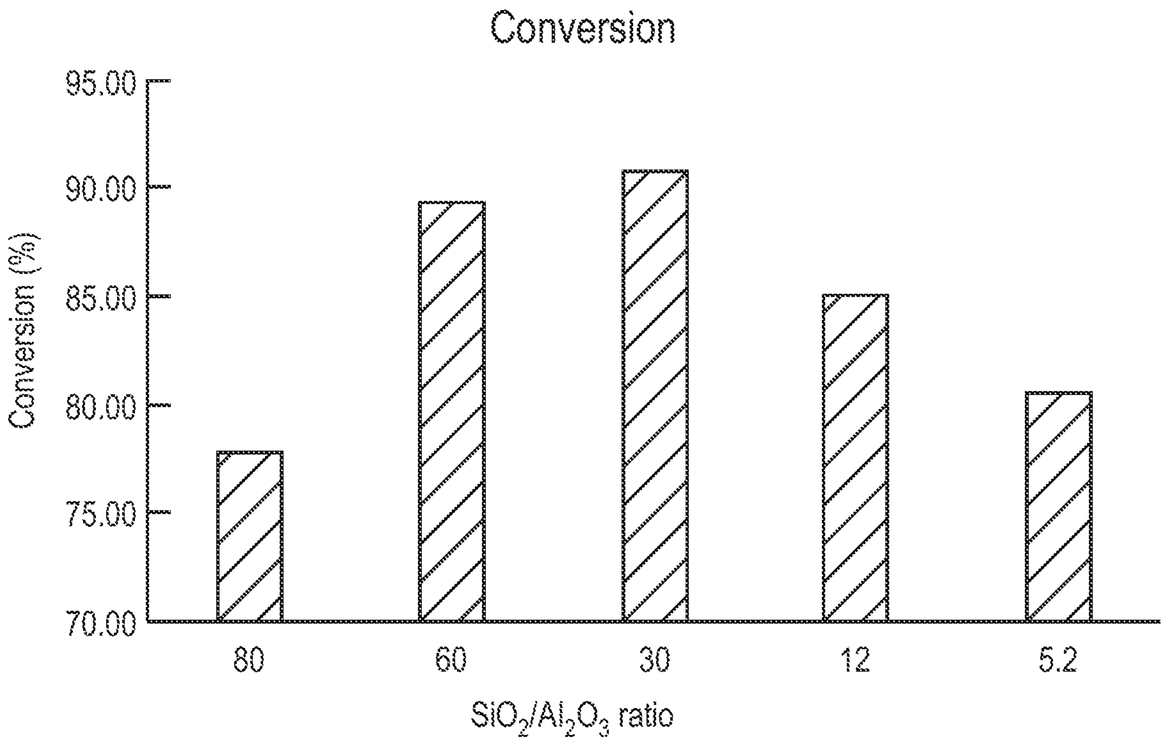
FIG. 2 depicts a bar graph of conversions of different catalysts.

Varying the acidity of the Y zeolite led to an improvement in feed conversion as shown in FIG. 2. Feed conversion improved with increasing acidity up to $SiO_2/Al_2O_3$ of 30 and decreased steadily for Y zeolite acidities higher than $SiO_2/Al_2O_3$ mole ratio of 30. Without wishing to be bound by theory, it is believed that $SiO_2/Al_2O_3$ of 30 for Y zeolite represents a good density of acidic sites for feed hydrocarbons. Without wishing to be bound by theory, it is believed that the conversion can be promoted (e.g., to 100%) and C3=yield increased (e.g., to 30 wt. 0%) by altering the acidity of the Y zeolite.

Embodiments

1) A catalyst, including:
a first zeolite including a member selected from the group consisting of ZSM-5 and Y zeolite;
a second zeolite including a member selected from the group consisting of ZSM-5 and Y zeolite;
wherein:
the second zeolite is different from the first zeolite;
the first zeolite is impregnated with $P_2O_5$; and
the second zeolite is impregnated with $La_2O_3$.

2) The catalyst of embodiment 1, wherein the first zeolite includes ZSM-5, and the second zeolite includes Y zeolite.

3) The catalyst of embodiment 1, wherein the first zeolite includes Y zeolite, and the second zeolite includes ZSM-5.

4) The catalyst of any one of embodiments 1-3, wherein the catalyst further includes:
alumina;
clay; and
silica.

5) The catalyst of embodiment 4, wherein the catalyst includes:
from 5 wt. % to 50 wt. % of the first zeolite;
from 5 wt. % to 50 wt. % of the second zeolite;
from 0.5 wt. % to 10 wt. % $La_2O_3$;
from 0.5 wt. % to 15 wt. % $P_2O_5$;
from 0.5 wt. % to 10 wt. % silica;
from 30 wt. % to 60 wt. % clay; and
from 2 wt. % to 20 wt. % alumina.

6) The catalyst of embodiment 4 or 5, wherein the catalyst includes:
20 wt. % of ZSM-5 impregnated with $P_2O_5$;
21 wt. % of Y zeolite impregnated with $La_2O_3$;
2 wt. % silica;
49 wt. % clay; and
8 wt. % alumina.

7) The catalyst of embodiment 6, wherein:
the ZSM-5 impregnated with $P_2O_5$ includes 7.5 wt. % $P_2O_5$; and
the Y zeolite impregnated with $La_2O_3$ includes 2.5 wt. % $La_2O_3$.

8) The catalyst of any one of embodiments embodiment 4-6, wherein the clay includes at least one member selected from the group consisting of kaolin and montmorillonite.

9) The catalyst of any one of embodiments 1-8, wherein the ZSM-5 has a silica to alumina molar ratio of 5 to 80.

10) The catalyst of any one of embodiments 1-9, wherein the Y zeolite has a silica to alumina molar ratio of 5 to 80.

11) The catalyst of any one of embodiments 1-10, wherein the ZSM-5 has a surface area of 200 $m^2/g$ to 800 $m^2/g$.

12) The catalyst of any one of embodiments 1-11, wherein the Y zeolite has a surface area of 200 $m^2/g$ to 800 $m^2/g$.

13) A method, including:
using the catalyst of any one of embodiments 1-12 to crack hydro-treated atmospheric residue.

14) A method, including:
using the catalyst of any one of embodiments 1-12 to crack hydro-treated vacuum gas oil residue.

15) A method including:
forming a first mixture including:
a first zeolite including a member selected from the group consisting of ZSM-5 and Y zeolite;
a second zeolite including a member selected from the group consisting of ZSM-5 and Y zeolite;
alumina;
clay; and
colloidal silica,
drying the first mixture; and
calcining the first mixture,
wherein:
the second zeolite is different from the first zeolite;
the first zeolite is impregnated with $P_2O_5$; and
the second zeolite is impregnated with $La_2O_3$.

16) The method of embodiment 15, wherein the first mixture is calcined at a temperature of 400° C. to 700° C.

17) The method of embodiment 15 or 16, further including, prior to forming the first mixture, impregnating the first zeolite with $P_2O_5$.

18) The method of embodiment 17, wherein impregnating the first zeolite with $P_2O_5$ includes:
forming a second mixture including the first zeolite and di-ammonium hydrogen phosphate;
drying the second mixture; and
calcining the second mixture.

19) The method of any one of embodiments 15-18, further including, prior to forming the first mixture, impregnating the second zeolite with $La_2O_3$.

20) The method of embodiment 19, wherein impregnating the second zeolite with $La_2O_3$ includes:
forming a third mixture including the second zeolite and lanthanum nitrate (III) hydrate;
drying the third mixture; and
calcining the third mixture.

What is claimed:

1. A catalyst, comprising:
a first zeolite comprising a member selected from the group consisting of ZSM-5 and Y zeolite;
a second zeolite comprising a member selected from the group consisting of ZSM-5 and Y zeolite;
wherein:
the second zeolite is different from the first zeolite;
the first zeolite is impregnated with $P_2O_5$;
the second zeolite is impregnated with $La_2O_3$; and the Y zeolite has a silica to alumina molar ratio of 5 to 80.

2. The catalyst of claim 1, wherein the first zeolite comprises ZSM-5, and the second zeolite comprises Y zeolite.

3. The catalyst of claim 1, wherein the first zeolite comprises Y zeolite, and the second zeolite comprises ZSM-5.

4. The catalyst of claim 1, wherein the catalyst further comprises:

alumina;

clay; and silica.

5. The catalyst of claim 4, wherein the catalyst comprises:

from 5 wt. % to 50 wt. % of the first zeolite;

from 5 wt. % to 50 wt. % of the second zeolite;

from 0.5 wt. % to 10 wt. % $La_2O_3$;

from 0.5 wt. % to 15 wt. % $P_2O_5$;

from 0.5 wt. % to 10 wt. % silica;

from 30 wt. % to 60 wt. % clay; and from 2 wt. % to 20 wt. % alumina.

6. The catalyst of claim 4, wherein the catalyst comprises:

20 wt. % of ZSM-5 impregnated with $P_2O_5$;

21 wt. % of Y zeolite impregnated with $La_2O_3$;

2 wt. % silica;

49 wt. % clay; and 8 wt. % alumina.

7. The catalyst of claim 6, wherein:

the ZSM-5 impregnated with $P_2O_5$ comprises 7.5 wt. % $P_2O_5$; and the Y zeolite impregnated with $La_2O_3$ comprises 2.5 wt. % $La_2O_3$.

8. The catalyst of claim 4, wherein the clay comprises at least one member selected from the group consisting of kaolin and montmorillonite.

9. The catalyst of claim 1, wherein the ZSM-5 has a silica to alumina molar ratio of 5 to 80.

10. The catalyst of claim 1, wherein the ZSM-5 has a surface area of 200 $m^2$/g to 800 $m^2$/g.

11. The catalyst of claim 1, wherein the Y zeolite has a surface area of 200 $m^2$/g to 800 $m^2$/g.

12. A method, comprising:

contacting the catalyst of claim 1 with hydro-treated atmospheric residue to crack the hydro-treated atmospheric residue.

13. A method, comprising:

contacting the catalyst of claim 1 with hydro-treated vacuum gas oil residue to crack the hydro-treated vacuum gas oil residue.

14. A catalyst, comprising:

from 5 wt. % to 50 wt. % of a first zeolite comprising a member selected from the group consisting of ZSM-5 and Y zeolite;

from 5 wt. % to 50 wt. % of a second zeolite comprising a member selected from the group consisting of ZSM-5 and Y zeolite;

from 0.5 wt. % to 10 wt. % silica;

from 30 wt. % to 60 wt. % clay; and from 2 wt. % to 20 wt. % alumina, wherein:

the second zeolite is different from the first zeolite;

the first zeolite is impregnated with $P_2O_5$; and the second zeolite is impregnated with $La_2O_3$;

the catalyst comprises from 0.5 wt. % to 10 wt. % $La_2O_3$; and the catalyst comprises from 0.5 wt. % to 15 wt. % $P_2O_5$.

15. The catalyst of claim 14, wherein the ZSM-5 has a surface area of 200 $m^2$/g to 800 $m^2$/g.

16. The catalyst of claim 14, wherein the Y zeolite has a surface area of 200 $m^2$/g to 800 $m^2$/g.

17. A catalyst, comprising:

20 wt. % of ZSM-5 impregnated with $P_2O_5$;

21 wt. % of Y zeolite impregnated with $La_2O_3$;

2 wt. % silica;

49 wt. % clay; and 8 wt. % alumina.

18. The catalyst of claim 17, wherein:

the ZSM-5 impregnated with $P_2O_5$ comprises 7.5 wt. % $P_2O_5$; and the Y zeolite impregnated with $La_2O_3$ comprises 2.5 wt. % $La_2O_3$.

19. The catalyst of claim 17, wherein the ZSM-5 has a surface area of 200 $m^2$/g to 800 $m^2$/g.

20. The catalyst of claim 17, wherein the Y zeolite has a surface area of 200 $m^2$/g to 800 $m^2$/g.

* * * * *